(12) United States Patent
Dickson

(10) Patent No.: US 7,596,563 B1
(45) Date of Patent: Sep. 29, 2009

(54) COMPUTERIZED FILE SYSTEM AND METHOD

(75) Inventor: Stephen Willard Dickson, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/428,384

(22) Filed: Oct. 28, 1999

(51) Int. Cl.
*G06F 7/00* (2006.01)

(52) U.S. Cl. ............... 707/10; 707/3; 707/8; 707/100; 707/200; 709/217; 709/218; 709/219

(58) Field of Classification Search .............. 707/1–10, 707/200–203, 100; 709/217–219, 203–204; 711/120, 141
See application file for complete search history.

(56) References Cited

U.S. PATENT DOCUMENTS

| | | | | |
|---|---|---|---|---|
| 4,482,999 A | * | 11/1984 | Janson et al. | 370/452 |
| 4,789,982 A | * | 12/1988 | Coden | 370/451 |
| 4,903,190 A | * | 2/1990 | Akai | 700/2 |
| 4,949,083 A | * | 8/1990 | Hirabayashi et al. | 370/452 |
| 5,014,192 A | * | 5/1991 | Mansfield et al. | 707/1 |
| 5,113,519 A | * | 5/1992 | Johnson et al. | 707/201 |
| 5,175,851 A | * | 12/1992 | Johnson et al. | 707/8 |
| 5,247,684 A | * | 9/1993 | Tavares et al. | 707/8 |
| 5,307,487 A | * | 4/1994 | Tavares et al. | 707/8 |
| 5,355,477 A | * | 10/1994 | Strickland et al. | 707/8 |
| 5,418,966 A | * | 5/1995 | Madduri | 710/200 |
| 5,454,108 A | * | 9/1995 | Devarakonda et al. | 709/104 |
| 5,506,961 A | * | 4/1996 | Carlson et al. | 713/200 |
| 5,515,537 A | * | 5/1996 | Tavares et al. | 710/244 |
| 5,564,062 A | * | 10/1996 | Meaney et al. | 710/244 |
| 5,588,059 A | * | 12/1996 | Chandos et al. | 380/279 |
| 5,628,005 A | * | 5/1997 | Hurvig | 707/8 |
| 5,634,122 A | * | 5/1997 | Loucks et al. | 707/8 |
| 5,649,099 A | * | 7/1997 | Theimer et al. | 726/4 |
| 5,659,682 A | * | 8/1997 | Devarakonda et al. | 707/8 |
| 5,742,812 A | * | 4/1998 | Baylor et al. | 707/201 |
| 5,774,551 A | * | 6/1998 | Wu et al. | 713/155 |
| 5,802,062 A | * | 9/1998 | Gehani et al. | 370/465 |
| 5,832,209 A | * | 11/1998 | Krantz | 713/201 |
| 5,884,308 A | * | 3/1999 | Foulston | 707/8 |
| 5,903,720 A | * | 5/1999 | Stokes | 726/4 |
| 5,915,253 A | * | 6/1999 | Christiansen | 707/103 R |
| 5,940,838 A | * | 8/1999 | Schmuck et al. | 707/200 |
| 5,946,685 A | * | 8/1999 | Cramer et al. | 707/10 |
| 5,950,199 A | * | 9/1999 | Schmuck et al. | 707/8 |
| 5,987,477 A | * | 11/1999 | Schmuck et al. | 707/201 |
| 6,018,785 A | * | 1/2000 | Wenniger | 710/200 |
| 6,021,508 A | * | 2/2000 | Schmuck et al. | 714/4 |
| 6,023,706 A | * | 2/2000 | Schmuck et al. | 707/200 |
| 6,032,216 A | * | 2/2000 | Schmuck et al. | 710/200 |

(Continued)

OTHER PUBLICATIONS

"Parallelizing I/O Intensive Image Access & Procewssing Applications"—Messerli et al.—IEEE Concurrency—vol. 7, Issue 2, Apr.-Jun. 1999 (pp. 28-37).*

(Continued)

*Primary Examiner*—Jean B. Fleurantin
*Assistant Examiner*—Anh Ly

(57) ABSTRACT

A computerized network file system and method are provided. The present invention permits the amount of network bandwidth that is consumed by tasks related to network file system overhead to be substantially reduced. The present invention also permits the amount of congestion in the network to be reduced.

34 Claims, 6 Drawing Sheets

U.S. PATENT DOCUMENTS

| | | | | |
|---|---|---|---|---|
| 6,044,378 | A * | 3/2000 | Gladney | 707/103 R |
| 6,094,721 | A * | 7/2000 | Eldridge et al. | 713/168 |
| 6,108,654 | A * | 8/2000 | Chan et al. | 707/8 |
| 6,117,188 | A * | 9/2000 | Aronberg et al. | 717/176 |
| 6,119,079 | A * | 9/2000 | Wang et al. | 704/8 |
| 6,119,151 | A * | 9/2000 | Cantrell et al. | 709/216 |
| 6,122,629 | A * | 9/2000 | Walker et al. | 707/8 |
| 6,122,631 | A * | 9/2000 | Berbec et al. | 707/9 |
| 6,182,124 | B1 * | 1/2001 | Lau et al. | 709/217 |
| 6,233,589 | B1 * | 5/2001 | Balcha et al. | 707/203 |
| 6,247,139 | B1 * | 6/2001 | Walker et al. | 714/2 |
| 6,249,879 | B1 * | 6/2001 | Walker et al. | 714/11 |
| 6,279,111 | B1 * | 8/2001 | Jensenworth et al. | 726/10 |
| 6,339,793 | B1 * | 1/2002 | Bostian et al. | 707/9 |
| 6,385,658 | B2 * | 5/2002 | Harter et al. | 719/312 |
| 6,385,701 | B1 * | 5/2002 | Krein et al. | 707/8 |
| 6,453,354 | B1 * | 9/2002 | Jiang et al. | 709/229 |
| 6,499,031 | B1 * | 12/2002 | Hopmann et al. | 707/8 |
| 7,007,235 | B1 * | 2/2006 | Hussein et al. | 715/751 |
| 2001/0014918 | A1 * | 8/2001 | Harter et al. | 709/313 |

OTHER PUBLICATIONS

"Recovery in the Calypso File System"—Devarakonda et al.—ACM Transaction on Computer Systems (TOCS), vol. 14, Issue 3 (Aug. 1996) (pp. 287-310).*

* cited by examiner

| CASE | CLIENT NODE 1 | SERVER NODE | CLIENT NODE 2 |
|---|---|---|---|
| 1 | REQUEST[A, B, C] → 300 ← GRANT [A, B, C] | A, B, C AVAILABLE  302 | NO CURRENT GRANT OF A, B, OR C |
| 2 | REQUEST[A, B] → 304  C IN MEMORY (ALREADY GRANTED) ← GRANT [A, B] | A AVAILABLE  REVOKE[B] → 306  310 | B CURRENTLY GRANTED  308 ← RELINQUISH[B] |
| 3 | REQUEST[A, B, C] → 300 ← GRANT [A, B, C] | REVOKE[A, B, C] → 314  302 | A, B, C CURRENTLY GRANTED  316 ← RELINQUISH[A, B, C] |

FIG. 3

COMPUTERIZED FILE SYSTEM AND METHOD

BACKGROUND OF THE INVENTION

1. Field of the Invention

The present invention relates to a computer file system and method, wherein one or more characteristics (e.g., actual data contained in the file, and/or meta-data associated with the file, such as file name/handle, ownership, related links, size, time of last modification, user access privilege-related data, etc.) of a data file maintained by a computer process (e.g., residing in a network computer node) may be accessed and modified by multiple other computer processes (e.g., residing in computer network client nodes), and a mechanism exists to maintain the coherency of the data file and its characteristics despite their being subject to modification by the multiple processes in the network. As used herein, the term "data file" comprises objects in a distributed computer file system, such as user and system program and data files, directories, and associated objects. Also as used herein, the "modification" of a data file may comprise the creation of the data file.

2. Brief Description of Related Prior Art

Data communication in a computer network involves data exchange between two or more entities interconnected by communication links. These entities are typically software program processes executing on computer nodes, such as endstations and intermediate stations. Examples of an intermediate station may be a router or switch which interconnects the communication links and subnetworks to enable transmission of data between the endstations. A local area network (LAN) is an example of a subnetwork that provides relatively short distance communication among the interconnected stations, whereas a wide area network enables long distance communication over links provided by public or private telecommunications facilities.

Communication software executing on the endstations correlate and manage data communication with other endstations. The stations typically communicate by exchanging discrete packets or frames of data according to predefined protocols. In this context, a protocol consists of a set of rules defining how the stations interact with each other. In addition, network routing software executing on the routers allow expansion of communication to other endstations. Collectively, these hardware and software components comprise a communications network and their interconnections are defined by an underlying architecture.

Modern communications network architectures are typically organized as a series of hardware and software levels or "layers" within each station. These layers interact to format data for transfer between, e.g., a source station and a destination station communicating over the network. Predetermined services are performed on the data as it passes through each layer and the layers communicate with each other by means of the predefined protocols. The lower layers of these architectures are generally standardized and are typically implemented in hardware and firmware, whereas the higher layers are generally implemented in the form of software running on the stations attached to the network. In one example of such a communications architecture there are five layers which are termed, in ascending interfacing order, physical interface, data link, network, transport and application layers. These layers are arranged to form a protocol stack in each communicating station of the network. FIG. 1 illustrates a schematic block diagram of prior art protocol stacks 125 and 175 used to transmit data between a source station 110 and a destination station 150, respectively, of a network 100. As can be seen, the stacks 125 and 175 are physically connected through a communications channel 180 at the interface layers 120 and 160. For ease of description, the protocol stack 125 will be described.

In general, the lower layers of the communications stack provide internetworking services and the upper layers, which are the users of these services, collectively provide common network application services. The application layer 112 provides services suitable for the different types of applications using the network, while the lower interface layer 120 accepts industry standards defining a flexible network architecture oriented to the implementation of LANs.

Specifically, the interface layer 120 comprises the physical interface layer 126, which is concerned with the actual transmission of signals across the communication channel and defines the types of cabling, plugs and connectors used in connection with the channel. The data link layer (i.e., "layer 2") 121 is responsible for transmission of data from one station to another and may be further divided into two sublayers: Logical Link Control (LLC 122) and Media Access Control (MAC 124).

The MAC sublayer 124 is primarily concerned with controlling access to the transmission medium in an orderly manner and, to that end, defines procedures by which the stations must abide in order to share the medium. In order for multiple stations to share the same medium and still uniquely identify each other, the MAC-sublayer defines a hardware or data link address called a MAC address. This MAC address is unique for each station interfacing to a LAN. The LLC sublayer 122 manages communications between devices over a single link of the network.

The network layer 116 (i.e., "layer 3") provides network routing and that relies on transport protocols for end-to-end reliability. An example of a network layer protocol is the Internet Protocol ("IP"). An example of such a transport protocol is the Transmission Control Protocol (TCP) contained within the transport layer 114. The term TCP/IP is commonly used to refer to the Internet architecture. (See, e.g., Tanenbaum, *Computer Networks. Third Ed.*, Prentice Hall PTR, Upper Saddle, River, N.J., 1996).

Data transmission over the network 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted over an established connection of channel 180 to the protocol stack 175 of the destination station 150 where they are passed up that stack to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header) to the data generated by the sending process as the data descends the stack.

For example, the network layer encapsulates data presented to it by the transport layer within a packet having a network layer header. The network layer header contains, among other information, source and destination (logical) network addresses needed to complete the data transfer. The data link layer, in turn, encapsulates the packet in a frame that includes a data link layer header containing information required to complete the data link functions, such as (physical) MAC addresses. At the destination station 150, these encapsulated headers are stripped off one-by-one as the flame propagates up the layers of the stack 175 until it arrives at the receiving process.

A computer file system controls the formatting of data files, maintaining the location of the data files in memory, the logical hierarchy of data files, user/process access privileges (e.g., in terms of reading and writing) to the data files, and other file-related tasks, such as house-keeping and administrative functions that keep track of data file statistics (e.g., sizes of the files, dates of creation and last modification of the files, etc.). Computer file systems are frequently integrated with the operating system such that, although a logical or functional distinction may be made between the two systems, they are intertwined with each other from a source code standpoint. When the processes that implement the file system reside in multiple nodes in a computer network, that file system may be termed a "distributed" computer file system.

A "client/server network" is one conventional type of computer network architecture wherein data files stored or residing in one computer node (commonly termed a "server" computer) in the network are shared, using a distributed computer file system, by multiple processing executing/residing in other computer nodes (commonly terms "client" computers) in the network. That is, data files and their characteristics stored or residing in the server computer node may be accessed and modified, via the distributed file system, by multiple processes executing/residing in the client computer needs.

The client/server network architecture offers advantages over other types of network architectures. For example, since in a client/server network, data files residing in the server computer node may be accessed by processes residing in the client computer nodes, copies of these files need not also reside in the client nodes. This increases the amount of client computers' resources that may be made available for other purposes, and eliminates the cost and time necessary to support and maintain separate copies of these files in the client computers.

In distributed file systems, maintaining the coherency of data files and file characteristics shared among, and subject to modification by multiple processes residing in the client nodes can be problematic. That is, since multiple processes residing in the client nodes may be able to access and modify the characteristics of data files stored in the server node, it becomes necessary for the file system to ensure coherency of these characteristics despite their being subject to modification by the multiple processes.

In one conventional solution to this problem, a file system management process residing in the server node grants sets (i.e., combinations) of different types of "tokens" to requesting client node processes that grant permission to the processes to modify particular characteristics of files stored in the server node. Each "token" is identified by the particular class/type to which it belongs, and is associated with a respective data file. In order for a process to be able to execute a respective modification to a respective data file characteristic, the process must first be granted permission by the network server's file management process, in the form of a grant of a respective set of different types/classes of tokens associated with that file and the modification.

More specifically, according to this prior art technique, when a client node process desires to modify a respective characteristic of a respective data file stored in the server node, the process transmits separate respective token grant request messages to the server node's file management process that request grant of each of tokens in the predetermined set of tokens required for permission to make the desired modification. In response to each respective request message, the file management process determines whether the respective token whose grant is being requested by the respective request message is available for grant to the client node process. If the respective token is available for grant, the file management process transmits a token grant message to the client process that grants that respective token to the client process. Conversely, if the respective token is not available for grant, for example, as a result of being currently granted to another client node process, the file management process may transmit a token revocation message to the other client node process to which the respective token is currently granted. In response to the token revocation message, the other client node process forwards to the file management process a token relinquishment message indicating that the other client node process has relinquished its grant of the respective token, thereby returning the respective token to the pool of tokens available for grant to the requesting client node process. The file management process may then transmit the token grant message to the client process. A client node process may execute a desired modification to a respective data file only after, and for as long as, the process has been granted the respective set of tokens required to make the desired modification.

Although this prior art technique is able to maintain the coherency of data file characteristics stored in the server node, it has certain disadvantages and drawbacks. For example, since only a single respective token may be requested and granted in each token request and grant message, respectively, when the set of tokens required for a desired file characteristic modification comprises more than one token, multiple token request and grant messages must be exchanged between the file management and requesting client node processes to enable the requesting client node process to carry out the desired file characteristic modification. Likewise, since only a single respective token may be revoked and relinquished in each token revocation and relinquishment message, respectively, if multiple tokens must be revoked and relinquished to enable the desired modification to take place, multiple token revocation and relinquishment messages must be exchanged to effect the revocation and relinquishment of such multiple tokens. Thus, since, at any given time, many client node processes may seek to modify, and may presently be engaged in modification of, characteristics of frequently-used data files stored in the server node, this can result in an undesirably large amount of network bandwidth being consumed by tasks related to network file system overhead, and can undesirably increase network congestion.

SUMMARY OF THE INVENTION

In accordance with the present invention, a computerized file system and method are provided that are able to overcome the aforesaid and other disadvantages of the prior art. More specifically, in one embodiment of the system of the present invention, a distributed computer file system is provided for use in a client/server network. A first process (e.g., a file system management process) residing in a server computer node maintains a data file in computer-readable memory in the server computer node. A second process (e.g., a client node process) generates a first message that requests that the second process be granted by the first process a plurality of tokens required for the second process to be able to modify at least one characteristic of the data file. In response to the first message, the first process generates a second message that grants the tokens to the second process if the tokens are available for grant to the second process.

In this embodiment, if any of the tokens are unavailable for grant to the second process as a result of being currently granted to a third process (e.g., a process residing in a second computer node), the first process may generate a third message that requests that the third process relinquish its current grant of the unavailable tokens. In response to the third message, the third process may generate a fourth message relinquishing the current grant of these tokens, thereby making the tokens available for grant by the first process to the second process. The second and third processes may reside in two different client nodes that are geographically remote from each other.

In accordance with the present invention, the tokens whose grant are requested by the second process via the first message, and granted to the second process via the second message, respectively, may comprise all of the tokens required to enable the second process to be able to modify the at least one characteristic of the data file. Further, the third and fourth messages each may specify a plurality of tokens whose previous grant is to be revoked and relinquished, respectively. This permits the number of token request, grant, revocation, and relinquishment messages that need to be generated and transmitted according to the present invention to be substantially reduced compared to the prior art. Advantageously, this permits the amount of network bandwidth that is consumed by tasks related to network file system overhead in a network embodying the present invention to be substantially reduced compared to the prior art. Further advantageously, this may also permit the amount of network congestion present in a network embodying the present invention to be reduced compared to the prior art.

These and other advantages of the present invention will become apparent as the following Detailed Description proceeds and upon reference to the Drawings, wherein like numerals depict like parts, and in which:

BRIEF DESCRIPTION OF THE DRAWINGS

FIG. 3 is a diagram illustrating messages that may be transmitted and received by processes in the network of FIG. 2.

Although the following Detailed Description will proceed with reference being made to illustrative embodiments and methods of use, it should be understood that the present invention is not intended to be limited to these embodiments and methods of use. Rather, the present invention should be viewed broadly, as being of broad scope limited only as set forth in the hereinafter appended claims.

DETAILED DESCRIPTION OF ILLUSTRATIVE EMBODIMENT

Figure 1:
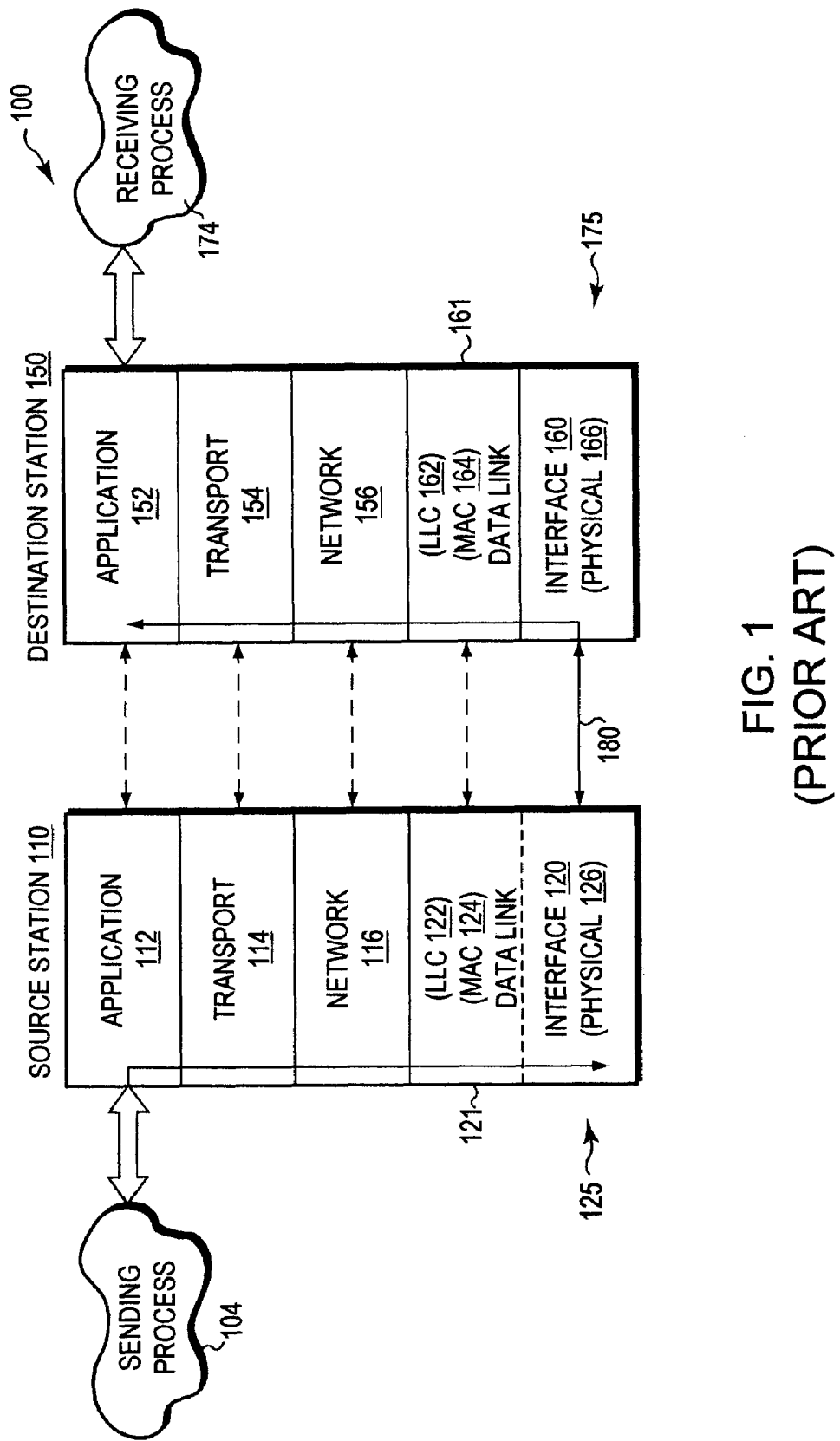
FIG. 1 is a highly schematic block diagram of prior art communications architecture protocol stacks used to transmit data between stations of a computer network.
Figure 2:
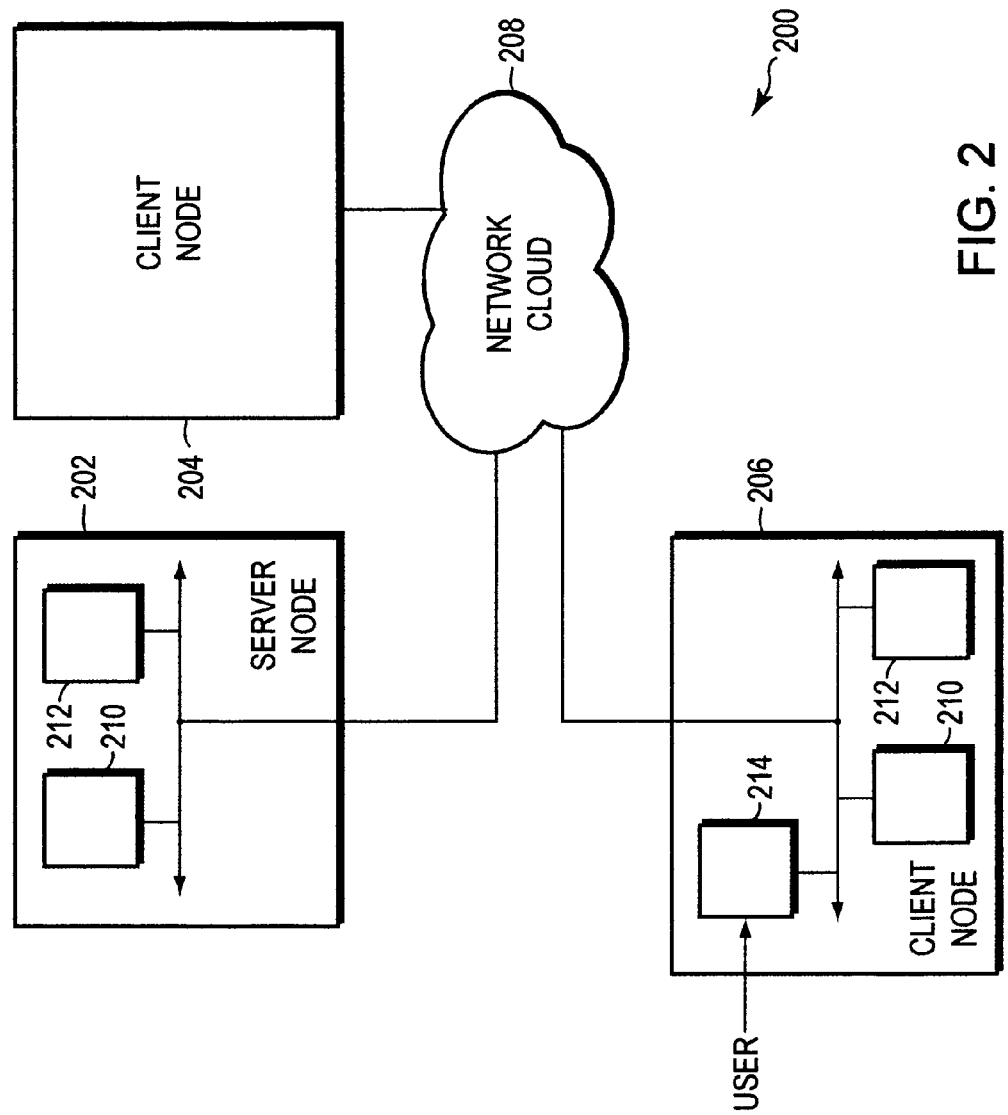
FIG. 2 is a highly schematic block diagram of a computer network comprising one embodiment of the computer file system of the present invention.
Figure 4:
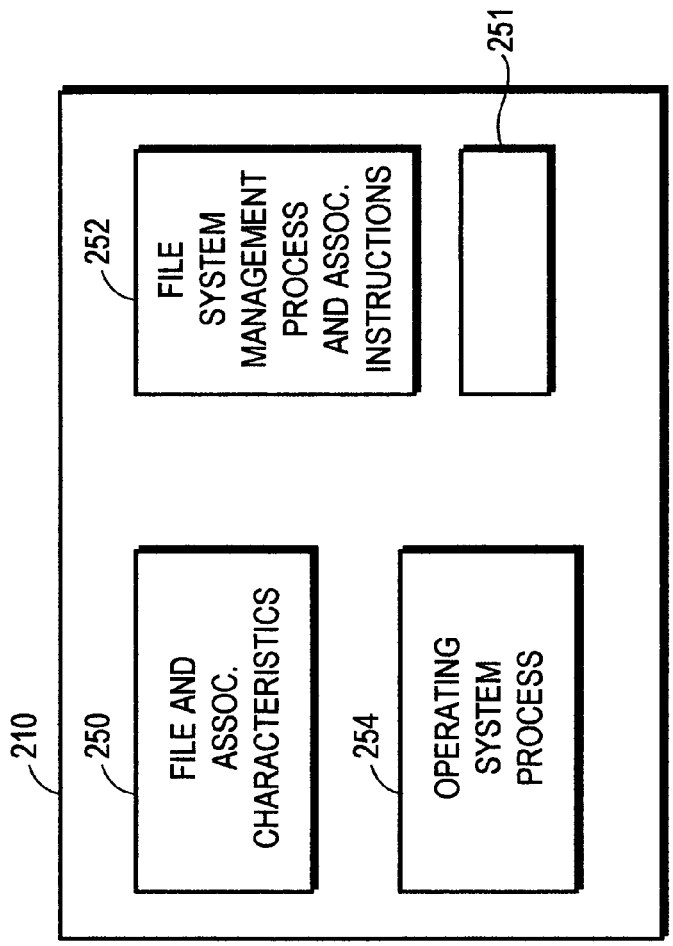
FIG. 4 is a highly schematic diagram illustrating processes and related program instructions and data structures that reside in memory in the server node in the network of FIG. 2.
Figure 5:
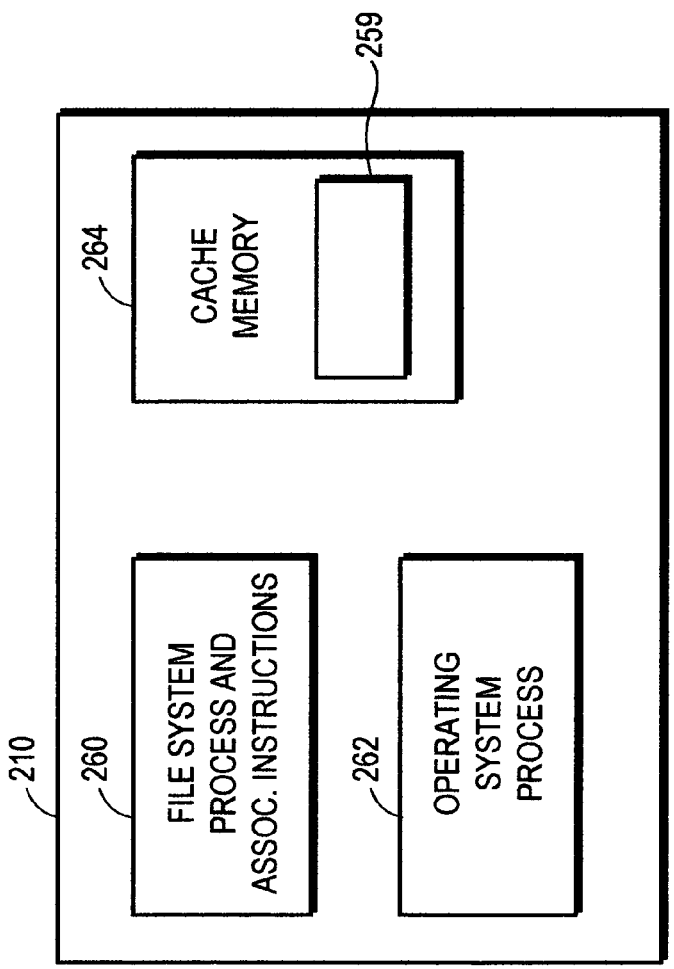
FIG. 5 is a highly schematic diagram illustrating processes and related program instructions and data structures that reside in memory of one of the client nodes in the network of FIG. 2.
Figure 6:
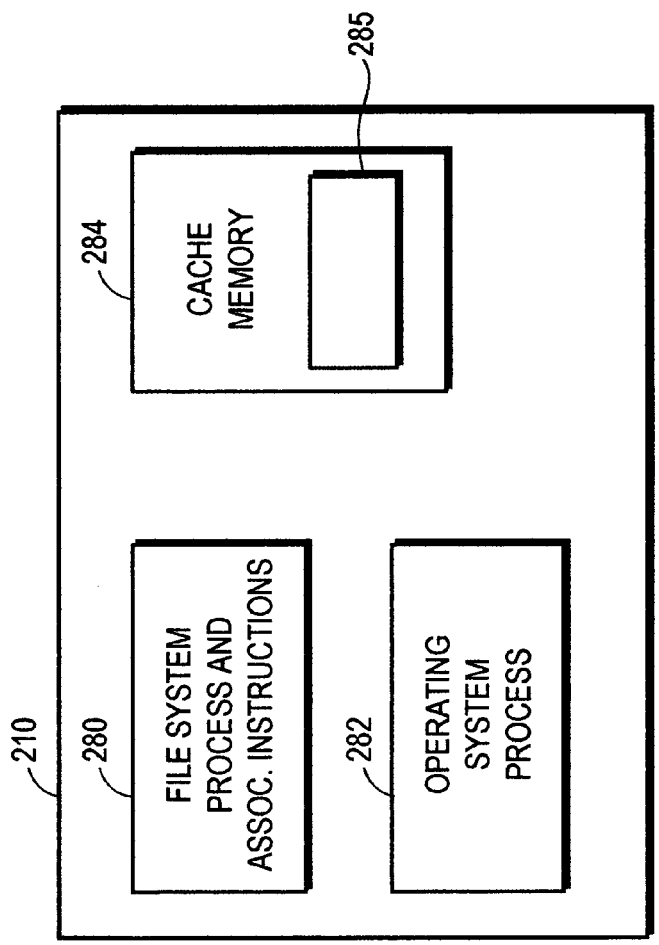
FIG. 6 is a highly schematic diagram illustrating processes and related program instructions and data structures that reside in memory of another one of the client nodes in the network of FIG. 2.

With reference being made to FIGS. 2-6, a distributed computer network 200, wherein one embodiment of the present invention may be advantageously used, will now be described. Network 200 includes a server computer node 202 and a plurality of client computer nodes 204, 206 interconnected by a network communications system (represented by network cloud 208). In general, each of the computer nodes includes computer-readable memory 210 for storing software programs, algorithms, and data structures associated with, and for carrying out, the inventive file system, and related and other methods and techniques described herein. In addition, each of the nodes further includes processor 212 for executing these software programs and algorithms, and for manipulating the stored data structures, to enable the nodes to carry out these methods and techniques in network 200. Each of the client nodes 204, 206 may also include a conventional user input/output interface 214 (e.g., comprising keyboard, pointing device, display terminal, etc.) for permitting a user to control and interact with the node. Like-wise, although not shown in the Figures, the server node 202 may also comprise such a user interface.

In operation, a data file and its associated characteristics (collectively and/or singly referred to herein after by the term "data file characteristic" and by numeral 250) are stored in memory 210 of node 202. The data file characteristic 250 is maintained in the server node's memory 210 by file system management process and associated executable instructions 252 resident in the server node's memory 210. The process 252 may be spawned by (or, alternatively, comprised in) one or more executing operating system processes 254 (e.g., comprised in the Alpha Server 64 Unix 5.0™ operating system of Compaq Computer Corp. of Houston, Tex.) that may also be resident in the memory 210 of the server node 202.

Also in operation, an executing distributed file system process 260 is resident in the memory 210 of client node 204. This process 260 may be spawned by (or, alternatively, comprised in) one or more executing operating system processes and associated executable instructions 262 also resident in the memory 210 of the client node 204. Cache memory 264, the purpose of which will be described in greater detail below, may also be comprised in the memory 210 of client node 204.

Also in operation, an executing distributed file system process 280 is resident in the memory 210 of client node 206. This process 280 may be spawned by (or, alternatively, comprised in) one or more executing operating system processes and associated executable instructions 282 also resident in the memory 210 of the client node 206. Cache memory 284, the purpose of which will be described in greater detail below, may also be comprised in the memory 210 of client node 206.

In this embodiment of the system of the present invention, when distributed file system process 260 desires to modify the data file characteristic 250 in server 202 (e.g., as a result of user input of commands to process 260 via the user interface of node 204), process 260 first determines which tokens are required to be granted to process 260 in order for process 260 to be able to carry out the desired modification to data file characteristic 250. For example, in system 200, in order to write to file 250 and thereby change its characteristics, process 260 must be granted by process 252 the following tokens: the ATTR_TOKEN token which grants permission to locally cache in cache memory 264 the non-static portions of the meta-data associated with the file 250, the MTIME_TOKEN token that grants permission to locally cache in cache memory 264 the last modification time of the file, and the SIZE_TOKEN token that grants permission to cache in cache memory 264 the byte size of the file 250. Depending upon the particular type of modification to the file characteristic 250 being requested by process 260, the number and type of tokens required to be granted to process 260 varies. In system 200, each type of respective possible modification that can be made by process 260 to the characteristics of file 250 is associated with a respective, set of different types of tokens, and can only be carried out by process 260 when that process 260 is granted the respective set of tokens associated with the respective modification. Process 260 maintains a table (not shown) in memory 210 of node 204 that correlates each of the respective possible modifications that can be made to the file 250, with the respective sets of tokens that must be granted to process 260 in order for process 260 to be able to carry out the respective modifications. For purposes of the present discussion, the tokens that must be granted to process 260 by process 252 to grant process 260 permission to execute the desired modification to data file characteristic 250 will be symbolically represented hereinafter as tokens A, B, and C.

When process 260 has determined the token set A, B, C that must be granted to process 260 in order for process 260 to be able to execute the desired modification to file characteristic 250, process 260 generates and forwards a message 300 via network 208 to file system management process 252 in node 202. The message 300 requests that process 260 be granted all of the tokens A, B, C necessary for process 260 to be able to execute the file characteristic modification that it desires to make. Message 300 contains information specifying the tokens, A, B, C, the node 204 and/or process 260 generating the message 300, and the file 250 associated with the tokens A, B, C. Of course, as will be appreciated by those skilled in the art, depending upon the manner in which system 200 is implemented, message 300 may contain information in addition to the foregoing.

Management process 252 maintains a table 251 that correlates respective pools of tokens that can be permissibly granted for each respective data file characteristic modification in the file system with the respective data files with which they are associated, and also indicates which of the tokens is presently granted, and if granted, the process (e.g., 260 or 280) in system 200 to which the token or tokens are granted. When server node 202 receives message 300, process 252 determines from this table 251 which of the tokens requested by the message 300 is currently available for grant to process 260. If as, is shown in the case 1 example in FIG. 3, all of tokens A, B, and C are presently available for grant to process 260 when process 252 receives message 300, process 252 generates and transmits, via network 208, token grant message 302 to process 260 in node 204. Grant message 302 identifies the data file 250 desired to be modified, and the tokens A, B, C being granted to process 260. Process 252 then updates the information contained in the table 251 from which it determined whether tokens A, B, C were available for grant, to reflect that tokens A, B, and C associated with file 250 have been granted to process 260.

Process 260 maintains in cache memory 264 a table 259 that correlates the tokens that it has been granted by process 252 with the data files with which they are associated. When process 260 receives message 302, process 260 updates this table 259 to reflect that process 260 has been granted the tokens A, B, C identified in message 302, and that tokens A, B, C are associated with file 250. Process 260 then determines whether it has yet to be granted any of the tokens (i.e., A, B, or C) that it requires to be able to carry out its desired file characteristic modification, based upon the information contained in the table 259. If after receipt by process 260 of message 302, as is the case in the present example, no additional tokens need to be granted for process 260 to be able to carry out its desired file characteristic modification, process 260 then undertakes such modification without the process 260 receiving a copy of the data file. Conversely, if any such required token has yet to be granted, process 260 waits to make such modification until it has been granted all such required tokens.

Also conversely, as is shown in the case 3 example in FIG. 3, if one or more of the tokens A, B, and/or C whose grant is requested in message 300 is not available for grant to process 260 when process 252 receives message 300 as a result of being currently granted to another client node process (e.g., process 280 in node 206), the server node process 252 generates and transmits to the other client node process 280 a token revocation message (e.g., message 314 in the case 3 example in FIG. 3). Message 314 requests that the other client node process 280 relinquish its grant of those tokens A, B, C whose grant has been requested by message 300, but currently are granted to process 280. When process 280 receives the token revocation message 314, the process 280 completes any on-going modification to the data file characteristic 250 that it is presently engaged in that requires grant of any of the tokens A, B, C whose relinquishment has been requested by message 314. Thereafter, process 280 generates and transmits to process 252, via network 208, a token relinquishment message (e.g., message 316 in the case 3 example in FIG. 3) that relinquishes grant of the tokens A, B, C whose relinquishment was requested in message 314. Process 280 then updates table 285 that it maintains in memory 284 that correlates the tokens that process 280 has been granted with the data files associated with those tokens. More specifically, process 280 updates table 285 to reflect the relinquishment of the grant of tokens A, B, C.

When process 252 receives the relinquishment message 216, it generates and transmits to process 260, via network 208, grant message 302, and updates the token grant table 251, in the manner described previously in connection with the case 1 example in FIG. 3. Likewise, when process 260 receives message 302, it updates the token grant table 259, in the manner described previously in connection with the case 1 example in FIG. 3.

Further conversely, as shown in the case 2 example in FIG. 3, if process 260 determines, prior to generating request message 300, that process 260 has already been granted one of the tokens C necessary for it to be able to undertake its desired file characteristic modification, instead of generating and transmitting token request message 300, process 260 generates and transmits to process 252 a different token request message 304. Token request message 304 is the same as request message 300, except that, the only tokens whose grant is requested by message 304 are those tokens A, B that process 260 determines are not currently granted to process 260. Just as is the case in the previous examples of cases 1 and 3, when process 252 receives message 304, process 252 examines the information in the token grant table 251 that it maintains in memory 210 of node 202 to determine which tokens whose grant is requested in message 304 are presently available for grant to process 260 (e.g., token A in the case 2 example). If process 252 determines that one or more tokens B requested in message 304 is currently unavailable for grant as a result of being currently granted to another client node process (e.g., process 280), instead of generating and transmitting revocation message 314, process 252 may generate and transmit to the other process 280 a different token revocation message 306. The information contained in message 306 is the same as that contained in message 314, except that the only tokens B that grant message 306 requests be relinquished are those whose grant has been requested in message 304 but are currently granted to process 280.

When process 280 receives message 306, it first completes any on-going modification to the data file characteristic 250 that it may be presently engaged in that requires grant of the token or tokens B whose grant message 306 has requested be relinquished After completing any such modification to the file characteristic 250, process 280 then generates and transmits to process 252 a token relinquishment message 308 that is the same as the relinquishment message 316, except that relinquishment message 308 only relinquishes grant of the token or tokens B requested by message 306. When process 280 generates and transmits message 308 to process 252, process 280 also updates the token grant table 285 that it maintains in memory 284 to reflect that process 280 no longer is granted the token or tokens B whose grant has been relinquished by message 308. When process 252 receives message 308, process 252 generates and transmits to process 260 a token grant message 310 granting tokens A, B to process 260. When process 252 generates and transmits message 310 to process 260, process 252 also updates the token grant table 251 to reflect the grant of these tokens A, B to process 260 and the relinquishment of the grant of tokens A, B to process 280.

When process 260 receives message 310, process 260 updates the token grant table 259 to reflect that process 260 has been granted the tokens A, B. Process 260 then undertakes the modification that it desires to make to the data file 250 that requires grant of tokens A, B, and C.

The foregoing description has been directed to specific embodiments of the present invention. It will be apparent, however, that other alternatives, variations and modifications may be made to the described embodiments, with the attainment of some or all of their advantages. Therefore, it is intended that the present invention be viewed as being of broad scope and as covering all such alternatives, modifications, and variations. Thus, it is intended that the present invention be defined only as set forth in the hereinafter appended claims.

What is claimed is:

1. A computerized data file system, comprising:
a first process to maintain a data file stored in a computer-readable memory; and
a second process to generate a first message requesting that said second process be granted by said first process a plurality of tokens required for said second process to modify at least one characteristic of said file stored in said computer-readable memory,
said first process to generate a second message, in response to said first message, that grants said tokens to said second process if said tokens are available for grant to said second process, and
if said tokens are granted, said second process to modify the at least one characteristic of said data file as maintained by said first process in said computer-readable memory without said second process receiving a copy of said data file.

2. A system according to claim 1, wherein:
said first process is resident at a server computer node, and said second process is resident at a client computer node.

3. A system according to claim 1, wherein:
if any of said tokens are unavailable for grant to said second process as a result of current grant of said tokens to at least one other process, said first process to generate a third message revoking the current grant of said tokens to said at least one other process.

4. A system according to claim 3, wherein:
said at least one other process, in response to said third message, is to generate a fourth message making said tokens available for grant by said first process.

5. A system according to claim 3, wherein:
said first process resides in a first computer node;
said second process resides in a second computer node;
said at least one other process resides in at least one other computer node; and
said first computer, second computer, and at least one other computer nodes are networked together and are remote from each other.

6. The system according to claim 1, wherein:
said second process, in response to receiving said second message, modifies said at least one characteristic of said file stored in said computer-readable memory.

7. A computer node, comprising:
a first process residing in the node to generate a first message that grants a set of tokens, if the set of tokens is available for grant, to a second process that requested grant of the set of tokens, the set of tokens being required for the second process to be able to modify at least one characteristic of a file stored in a computer-readable memory within the computer node,
if the second process receives the set of tokens, the second process to modify the at least one characteristic of the file without receiving a copy of the file.

8. A node according to claim 7, wherein:
the second process resides in a remote computer node.

9. A node according to claim 8, wherein:
one of the first and second processes resides in a server computer node and the other of the processes resides in a client computer node.

10. A node according to claim 7, wherein:
if at least one token in the set of tokens is unavailable for grant because the at least one token is currently granted to a third process, the first process to also generate a second message that revokes current grant of the at least one token to the third process prior to generating the first message.

11. A node according to claim 7, wherein:
the first message is generated by the first process in response to a request for the grant of the set of tokens generated by the second process, the request specifying all tokens required for the second process to be able to modify the at least one characteristic of the file.

12. A computer node, comprising:
a first process residing in said node to generate a request to a second process for grant of a set of tokens required to enable the first process to modify at least one characteristic of a file residing in a remote computer-readable memory,
if the first process receives the set of tokens, the first process to modify, the at least one characteristic of the file residing in the remote computer-readable memory without receiving a copy of the file.

13. A node according to claim 12, wherein:
the second process resides in a second computer node, and the memory is contained in said second node.

14. A node according to claim 12, wherein:
the set of tokens comprises all tokens required for the first process to be able to modify the at least one characteristic of the file.

15. A network computer system, comprising:
a first computer node having a data file stored in a computer-readable memory; and
a second computer node to issue to the first computer node a first message requesting grant of a set of tokens required to carry out a modification of at least one characteristic of the file stored in the first computer node,
the first computer node to issue a second message to the second computer node after receipt of the first message, the second message granting the set of tokens to the first process if the set of tokens is available for grant to the second process, and
if the set of tokens are granted, the second computer node to modify the at least one characteristic of the file stored in the first computer node without the second computer node receiving a copy of the file.

16. A system according to claim 15, wherein:
the first computer node is a server node, and the second computer node is a non-server node.

17. A system according to claim 15, wherein:
the set of tokens comprises all tokens required to carry out the modification of the at least one characteristic of the file.

18. A system according to claim 15, wherein:
if at least one token in the set of tokens is unavailable for the grant because the at least one token is currently granted, the first computer node waits to issue the first message until after the first computer node receives a third message from a third computer node indicating relinquishment of current grant of the at least one token.

19. A system according to claim 18, wherein:
the at least one token comprises a plurality of tokens.

20. Computer-readable memory containing computer-executable program instructions, the instructions comprising:
first instructions maintaining a data file in a computer storage memory;
second instructions generating a first message requesting grant, to a process, of a plurality of tokens required to modify at least one characteristic of said file located in said computer storage memory;
third instructions generating a second message, in response to said first message, that grants said tokens if said tokens are available for grant to said process; and
fourth instructions, responsive to the plurality of tokens being granted, modifying the at least one characteristic of said data file located in said computer storage memory without said process receiving a copy of said data file.

21. Computer-readable memory according to claim 20, further comprising:
further instructions generating a third message, if any of said tokens are unavailable for grant as a result of a current grant of said tokens, revoking the current grant of said tokens.

22. A computer-readable memory according to claim 21, wherein:
said further instructions, in response to said third message, generate a fourth message making said tokens available for grant.

23. Computer-readable memory containing computer-executable program instructions, the instructions comprising:
first instructions generating a first message that grants a set of tokens, if the set of tokens is available for grant, to a requester of the set of tokens, the set of tokens being required to permit the requester to be able to modify at least one characteristic of a file stored in computer storage memory, and
second instructions, responsive to the set of tokens being granted to the requester, modifying the at least one characteristic of the file stored in the computer storage memory without the requester receiving a copy of said data file.

24. Computer-readable memory according to claim 23, further comprising:
further instructions generating a second message, if at least one token in the set of tokens is unavailable for grant because the at least one token is currently granted, that revokes previous grant of the at least one token prior to generating the first message.

25. Computer-readable memory according to claim 23, wherein:
the first message is generated in response to a request for the grant of the set of tokens generated, the request specifying all tokens required to be able to modify the at least one characteristic of the file.

26. Computer-readable memory containing computer-executable program instructions, the instructions comprising:
first instructions generating a request for grant of a set of tokens required to enable modification by an issuer of the request of at least one characteristic of a file residing in a storage memory; and
second instructions responsive to the set of tokens being granted to the issuer, modifying the at least one characteristic of the file residing in the storage memory without the issuer receiving a copy of the file.

27. Computer-readable memory according to claim 26, wherein:
the set of tokens comprises all tokens required to be able to modify the at least one characteristic of the file.

28. A computerized method for coherently maintaining and modifying a data file, comprising:
a first process maintaining the said data file in a computer-readable memory;
a second process generating a first message requesting grant of a plurality of tokens required to modify at least one characteristic of said data file in said computer-readable memory;
the first process generating a second message, in response to said first message, that grants said tokens if said tokens are available for grant; and
if said tokens are granted, the second process modifying said at least one characteristic of said data file maintained by the first process in said computer-readable memory without the second process receiving a copy of the data file.

29. A method according to claim 28, further comprising:
if any of said tokens are unavailable for grant as a result of current grant of said tokens to at least one other process, generating a third message revoking the grant of said tokens.

30. A method according to claim 29, wherein:
in response to said third message, a fourth message making said tokens available for grant is generated.

31. The method according to claim 28, further comprising:
modifying said at least one characteristic of said file in said computer-readable memory.

32. A computerized method for use in maintaining coherency of a data file stored in a computer-readable memory, comprising:
generating a first message that grants a set of tokens, if the set of tokens is available for grant, to a requester of the grant of the set of tokens, the set of tokens being required for the requester to be able to modify at least one characteristic of the file stored in the computer-readable memory; and in response to the set of tokens being granted to the requester, modifying the at least one characteristic of the file stored in the computer-readable memory without the requester receiving a copy of the file.

33. A method according to claim 32, wherein:

if at least one token in the set of tokens is unavailable for grant because the at least one token has been currently granted, the method also comprises a second message that revokes current grant of the at least one token prior to generating the first message.

34. A method according to claim 32, wherein:

the first message is generated in response to a request for the grant of the set of tokens generated by the requester, the request specifying all tokens required for the requester to be able to modify the at least one characteristic of the file.

* * * * *

UNITED STATES PATENT AND TRADEMARK OFFICE
CERTIFICATE OF CORRECTION

| | | |
|---|---|---|
| PATENT NO. | : 7,596,563 B1 | Page 1 of 1 |
| APPLICATION NO. | : 09/428384 | |
| DATED | : September 29, 2009 | |
| INVENTOR(S) | : Stephen Willard Dickson | |

It is certified that error appears in the above-identified patent and that said Letters Patent is hereby corrected as shown below:

In column 10, line 58, in Claim 12, delete "modify," and insert -- modify --, therefor.

In column 12, line 26, in Claim 26, delete "instructions" and insert -- instructions, --, therefor.

Signed and Sealed this
Twenty-eighth Day of December, 2010

David J. Kappos
*Director of the United States Patent and Trademark Office*